(12) United States Patent
Keeton

(10) Patent No.: US 8,529,764 B2
(45) Date of Patent: Sep. 10, 2013

(54) SOLAR POWERED AERATION AND MICROBIAL INCUBATION SYSTEM

(76) Inventor: Jimmie A. Keeton, Fort Collins, CO (US)

(*) Notice: Subject to any disclaimer, the term of this patent is extended or adjusted under 35 U.S.C. 154(b) by 318 days.

(21) Appl. No.: 12/860,030

(22) Filed: Aug. 20, 2010

(65) Prior Publication Data

US 2011/0042309 A1   Feb. 24, 2011

Related U.S. Application Data

(60) Provisional application No. 61/235,642, filed on Aug. 20, 2009.

(51) Int. Cl.
*C02F 3/02* (2006.01)
*C02F 3/30* (2006.01)
*C02F 1/00* (2006.01)
*H02N 6/00* (2006.01)

(52) U.S. Cl.
USPC ....... 210/610; 210/620; 210/170.06; 136/244

(58) Field of Classification Search
USPC ............ 210/610, 615, 620, 629, 242.1, 192; 136/244
See application file for complete search history.

(56) References Cited

U.S. PATENT DOCUMENTS

| | | | |
|---|---|---|---|
| 3,523,891 A | | 8/1970 | Mehl |
| 4,230,569 A * | | 10/1980 | Lohrberg et al. ............. 210/754 |
| 4,906,359 A * | | 3/1990 | Cox, Jr. .................. 210/170.02 |
| 5,344,557 A * | | 9/1994 | Scanzillo ........................ 210/94 |
| 5,478,473 A | | 12/1995 | Oshima |
| 6,344,144 B1 * | | 2/2002 | Long et al. ..................... 210/620 |
| 6,348,147 B1 * | | 2/2002 | Long ............................. 210/150 |
| 6,676,837 B2 * | | 1/2004 | Keeton, Jr. .................... 210/620 |
| 7,736,509 B2 * | | 6/2010 | Kruse ............................ 210/602 |
| 2001/0035381 A1 * | | 11/2001 | Allen et al. ................... 210/749 |
| 2002/0104807 A1 | | 8/2002 | Keeton, Jr. |

OTHER PUBLICATIONS

Hendricks, Fundamentals of Water Treatment Unit Processes: Physical, Chemical, and Biological, 2011, CRC Press, p. 361.*

* cited by examiner

*Primary Examiner* — Nam Nguyen
*Assistant Examiner* — Claire Norris
(74) *Attorney, Agent, or Firm* — William W. Cochran; Cochran Freund & Young LLC

(57) ABSTRACT

Disclosed is a system and method for treating a body of water, without the necessity of being connected to an electrical grid, that includes photovoltaic collectors and a battery bank that is charged by the photovoltaic collectors. The photovoltaic collectors and the battery bank operate a series of air pumps that are connected to an air pump manifold to create a uniform source of compressed air that is distributed to a plurality of floating diffuser manifolds. A plurality of air stones are suspended under the floating diffuser manifolds that create air bubbles that are absorbed by the body of water and circulate said body of water to disburse a microbial fluid. In addition, an incubator system is also connected to an air pump that incubates microbes to form a microbial fluid that can be automatically dispersed throughout the body of water.

4 Claims, 4 Drawing Sheets

SOLAR POWERED AERATION AND MICROBIAL INCUBATION SYSTEM

CROSS REFERENCE TO RELATED APPLICATIONS

The present application is based upon and claims priority to U.S. provisional application Ser. No. 61/235,642, filed Aug. 20, 2009, by Jimmie A. Keeton, entitled "Solar Powered Aeration and Microbial Incubation System." The entire content of this application is hereby specifically incorporated herein by reference for all it discloses and teaches.

BACKGROUND OF THE INVENTION

Aeration systems have been used to aerobically clean bodies of water such as ponds, lakes and lagoons. Aeration systems have also been used for cleaning waste water, aquaculture ponds and sewage systems. In addition, microbial treatment of bodies of water, has also been successfully used for bioremediation.

SUMMARY OF THE INVENTION

An embodiment may therefore comprise a method of treating a body of water without being connected to a power grid comprising: generating photovoltaic electrical power with photovoltaic collectors; providing a battery bank that is coupled to the photovoltaic collectors that provides electrical battery power; using the photovoltaic electrical power to charge the battery bank; operating a plurality of air pumps using power from both the photovoltaic electric power and electrical battery power; applying compressed air generated by the plurality of air pumps to at least one air pump manifold that provides at least one uniform source of compressed air; applying the at least one uniform source of compressed air to a plurality of flow meters that control a flow of air to a plurality of manifold air hoses; controlling the flow of air through the plurality of manifold air hoses using the plurality of flow meters to distribute air through the plurality of manifold air hoses in a predetermined manner to a plurality of floating diffuser manifolds; applying the uniform source of air to an incubator flow meter; connecting the incubator flow meter to an incubator air hose; connecting the incubator air hose to an incubator diffuser disposed in an incubator; generating a flow of incubator air bubbles from the incubator diffuser in an incubator fluid disposed in the incubator to promote growth of probiotic microbes and microbes designed for bioremediation in the incubator to produce a microbial fluid; dispensing the microbial fluid into the body of water; connecting the plurality of manifold air hoses to the plurality of floating diffuser manifolds to produce a uniform diffuser manifold air pressure in the diffuser manifold; applying the uniform diffuser manifold air pressure to a plurality of floating diffuser air hoses that are weighted to extend into the body of water below the floating diffuser manifold; attaching a plurality of diffusers to the floating diffuser air hoses so that the uniform diffuser manifold air pressure is applied to the plurality of air stones which generate a flow of air bubbles in the body of water that aerate the body of water to increase aerobic activity in the body of water and that causes the body of water to circulate which disperses the microbial fluid in the body of water.

The present invention may further comprise a system for treating a body of water that is not connected to an electrical grid comprising: photovoltaic collectors that generate photovoltaic electrical power; a battery bank that produces electrical battery power, the battery bank coupled to the photovoltaic collectors so that the photovoltaic collectors charge the battery bank with the photovoltaic electric power; a plurality of air pumps coupled to the photovoltaic collectors that operate in response to the photovoltaic electrical power and the electrical battery power; at least one air pump manifold connected to the plurality of air pumps that provides at least one uniform source of compressed air; a plurality of flow meters coupled to the at least one air pump manifold that control a flow of the at least one uniform source of compressed air to a plurality of manifold air hoses; a microbial incubator having an incubator fluid containing probiotic microbes and microbes designed for bioremediation; an incubator air hose; an incubator flow meter coupled to the at least one air pump manifold that controls a flow of the at least one uniform source of compressed air through the incubator air hose; an incubator diffuser, coupled to the air hose, that generates a flow of incubator air bubbles in the incubator fluid in response to the flow of the at least one uniform source of compressed air that causes the incubator fluid to circulate and aerate the incubator fluid which promotes growth of the probiotic microbes and the microbes designed for bioremediation to create a microbial fluid; a plurality of floating diffuser manifolds, connected to the plurality of manifold air hoses, that provide a uniform diffuser manifold air pressure in the plurality of floating diffuser manifolds in response to the flow of the at least one uniform source of compressed air from the plurality of flow meters; a plurality of weighted floating diffuser air hoses, that are coupled to the plurality of floating diffuser manifolds, that extend into the body of water below the plurality of floating diffuser manifolds; a plurality of diffusers, that are coupled to the plurality of weighted floating diffuser air hoses, that produce a flow of air bubbles in the body of water in response to the uniform diffuser manifold air pressure that aerates the body of water and increases aerobic activity in the body of water and causes the body of water to circulate and disperse the microbial fluid.

DETAILED DESCRIPTION OF THE EMBODIMENTS

Figure 1:
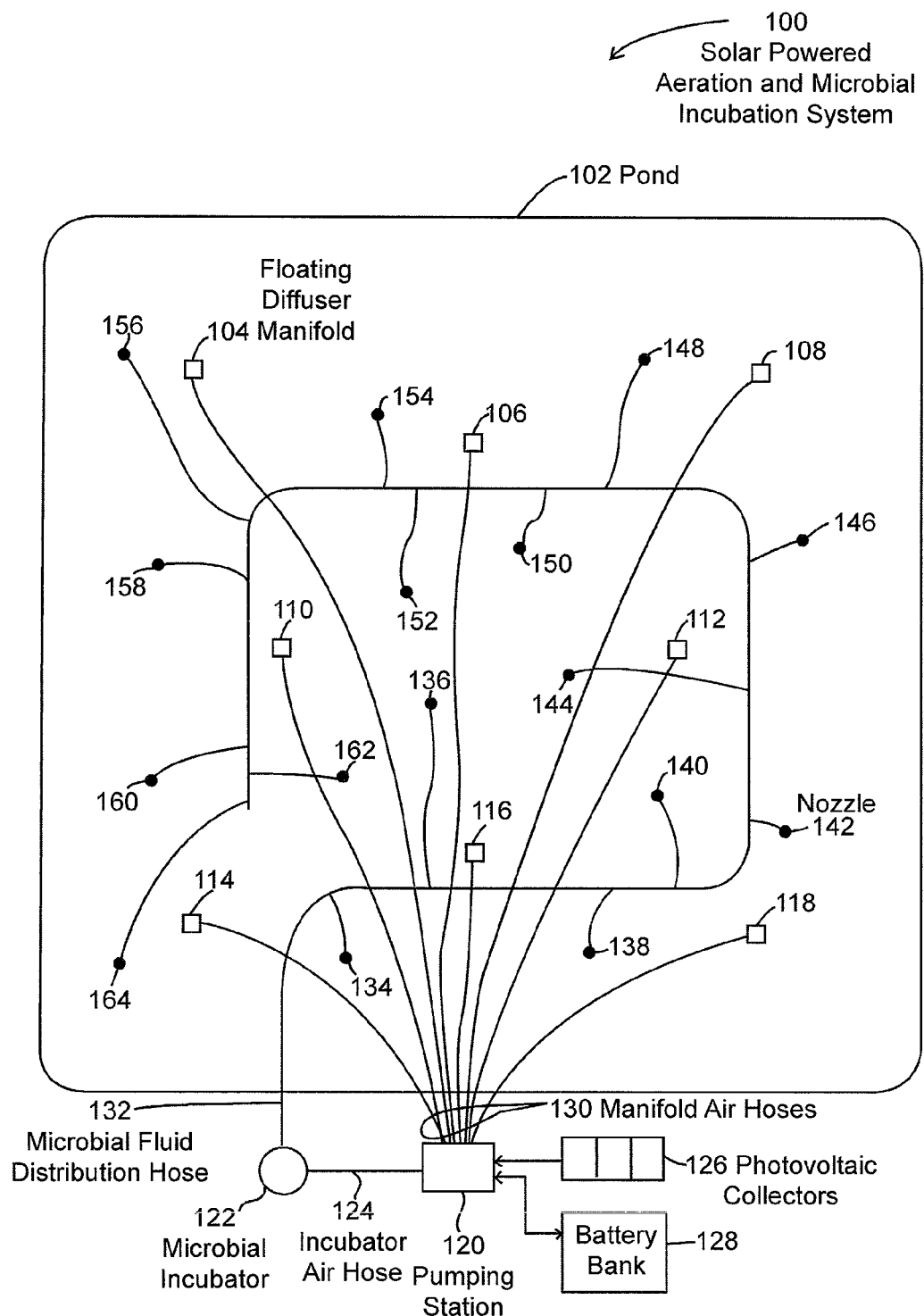
FIG. 1 is a schematic top view of an embodiment of a solar powered aeration and microbial incubation system.

FIG. 1 is a schematic top view of an embodiment of a solar powered aeration and microbial incubation system 100. As shown in FIG. 1, the solar powered aeration and microbial incubation system 100 is disposed in a pond 102 or other body of water. The pond may comprise a natural body of water, such as a fishing pond, a man-made body of water, or a body of water that has been constructed for farming fish, shrimp or other water-based animals or plants. Further, the pond may be a sludge pond, such as a wastewater pond that includes organic materials that can be aerobically treated and/or treated with microbes, such as probiotics or other water quality improving microbes. Probiotics can be used to control pathogenic bacteria while other species can be designed for bioremediation by digestion of organic solids, reductions in ammonia, nitrite and nitrate.

The pond 102, illustrated in FIG. 1, has a plurality of floating grid aerators that float on the surface of pond 102 that comprise a plurality of floating manifolds, such as floating diffuser manifolds 104, 106, 108, 110, 112, 114, 116, 118 that are individually connected to a plurality of manifold air hoses 130. The manifold air hoses 130 are coupled to a pumping station 120 that pumps air through the manifold air hoses 130 to the floating diffuser manifolds 104-118. Pumping station 120 is operated by a battery bank 128 and a plurality of photovoltaic collectors 126. Pumping station 120 has an incubator air hose 124 that is connected to a microbial incubator 122 that incubates various microbes, as disclosed in more detail below. The incubated microbes in the microbial incubator 122 are then dispersed through a microbial fluid distribution hose 132 that is coupled to the microbial incubator 122. The microbial fluid 289 is distributed by the microbial fluid distribution hose 132 to a plurality of nozzles 134, 136, 138, 140, 142, 144, 146, 148, 150, 152, 154, 156, 158, 160, 162, 164. The nozzles 134-164 are spread throughout the pond 102 to evenly disperse the microbial fluid 289. Alternatively, the microbial fluid 289 in the microbial fluid incubator 122 can be spread using other types of sprayers or by hand in a manner to achieve a substantially even distribution throughout the pond 102.

Figure 2:
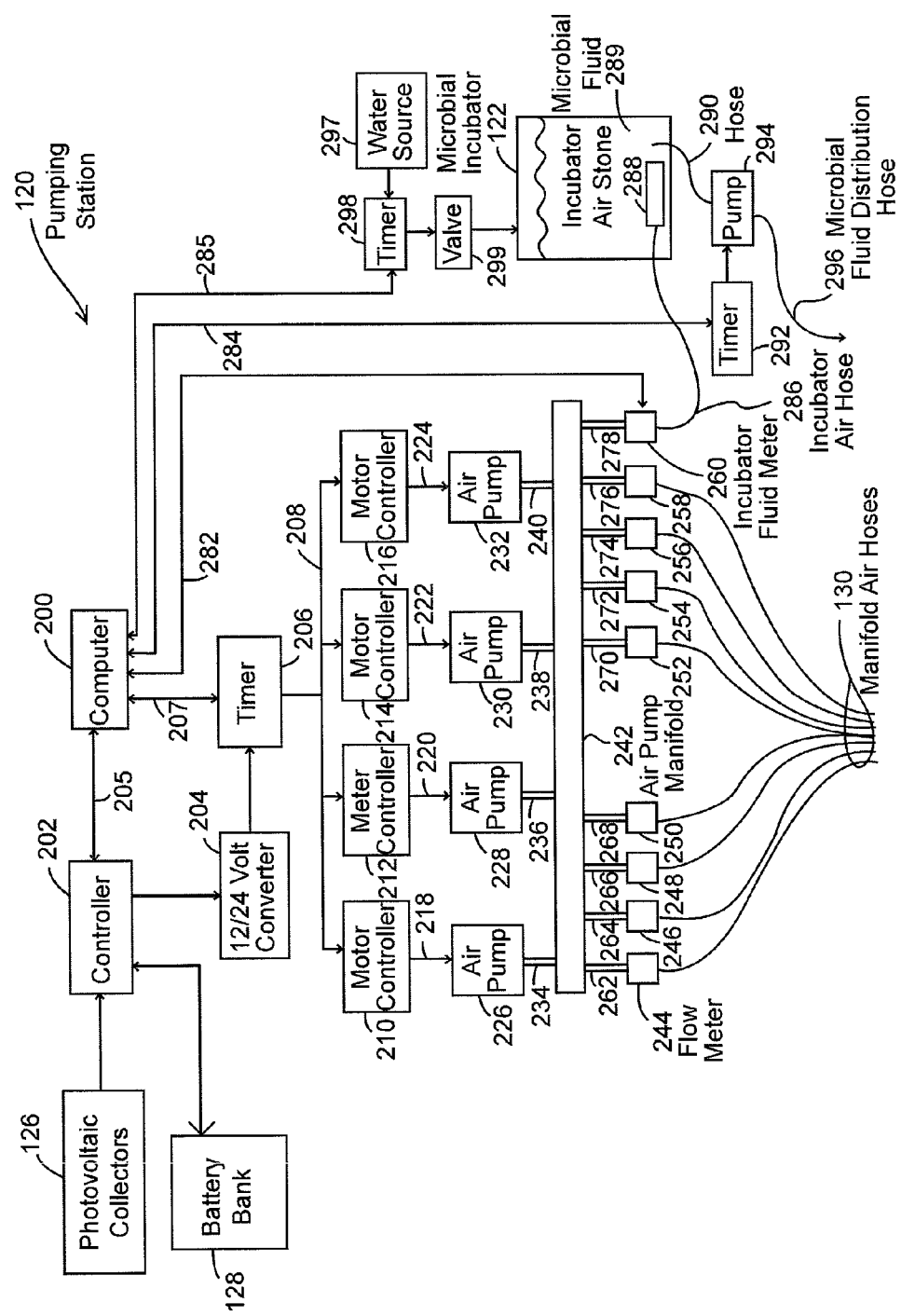
FIG. 2 is a schematic block diagram of an embodiment of a pumping station that is coupled to photovoltaic collectors, a battery bank and a microbial incubator.

FIG. 2 is a schematic block diagram of an embodiment of a pumping station 120 which illustrates the manner of which the pumping station 120 is connected to the photovoltaic capacitors 126, battery bank 128 and the microbial incubator 122. As shown in FIG. 2, the pumping station 120 includes a computer 200 that is coupled to and controls controller 202, timer 206, flow meters 244, 246, 248, 250, 252, 254, 256, 258, 260, timer 292 and timer 298 via communication lines 205, 207, 282, 284 and 285, respectively. Controller 202 is an electrical controller that controls the application of current from photovoltaic collectors 126 and battery pack 128 to converter 204. In addition, converter 202 controls the charging of the battery bank 128 by application of current from photovoltaic collectors 126, as needed. Computer 200 can be disposed proximate to or part of the pumping station 120, or can be connected via a network, such as the Internet, an intranet, a VPN or other network, to the pumping station 120. Computer 200 sends commands that are capable of controlling the operation of the controller 202 and setting parameters for operation of the controller 202, as well as timer 206, flow meters 244-260 and timer 292. For example, computer 200 may send commands to timers 206, 292, 298 to reset the operational periods of timers 206, 292, 298. Further, commands may be sent by the computer 200 to set the flow rate of each of the individual flow meters 244-260. Further, communication lines 205, 207, 282, 284, 285 allow the flow meters 244-260 and timers 206, 292, 298 to be monitored by computer 200.

As also shown in FIG. 2, a 12 to 24-volt converter 204 is coupled to the controller 202 that converts a 12-volt signal from the output of controller 202 that is supplied either by the photovoltaic collectors 126 and/or the battery pack 128 to converter 204. Converter 204 converts the 12-volt DC power to 24-volt DC power. Alternatively, battery bank 128 and photovoltaic collectors 126 can be connected to provide 24-volt DC power and thereby eliminate the 12 to 24-volt DC converter 204. Further, the devices illustrated in the pumping station 120, such as air pumps 226-232 can be selected to be devices that operate on 12-volt DC power rather than 24-volt DC power.

FIG. 2 further illustrates a plurality of motor controllers, such as motor controllers 210, 212, 214, 216 that are connected to timer 206 and receive the 24-volt DC power signal from the timer 206 during the period in which the timer 206 is activated. Motor controllers 210-216 comprise conventional motor controllers that control the operation of air pumps 226-232. Motor controllers 210-216 provide the optimum power to the air pumps 226-232 so that the air pumps 226-232 operate at optimal efficiency. Air pumps 226-232 generate a source of compressed air in conduits 234, 236, 238, 240. Conduits 234-240 are coupled to an air pump manifold 242 that provides a single source of compressed air that has a uniform pressure. Each of the air pumps 226-232 pumps air into the air pump manifold 242 to create a uniform source of compressed air. A floating grid aerator system that comprises a plurality of floating diffuser manifolds 262, 264, 266, 268, 270, 272, 274, 276, 278 (FIG. 1) are connected to the air pump manifold 242 and to flow meters 244, 246, 248, 250, 252, 254, 256, 258. An incubator flow meter 260 is also connected to the air pump manifold 242. Flow meters 244-260 control the flow rate of the uniform source of compressed air that is present in the air pump manifold 242 into the manifold air hoses 130. In this manner, the compressed air generated by air pumps 226-232 is collected and provided to the flow meters 244-260 to provide an even and uniform source of compressed air at the input conduits 262-278 of the flow meters 244. As such, it is substantially easier to individually control the pressure and flow of air in each of the manifold air lines, which typically require different pressures/flow rates as a result of the different locations of the floating diffuser manifolds 104-118.

As also shown in FIG. 2, the incubator flow meter 260 controls the flow of air into the incubator air hose 286. The incubator air hose 286 is connected to a incubator air stone 288, or other diffuser, such as a fine bubble membrane diffuser, that is disposed in the microbial fluid 289 disposed in microbial incubator 122. The incubator air stone 288 provides fine bubbles that activate the aerobic activity in the microbial fluid 289 in the microbial incubator 122. A hose 290 is connected to the microbial incubator 122 and to a pump 294. Timer 292 activates the pump 294 to pump the microbial fluid 289 through the microbial fluid distribution hose 296 for distribution in the pond 102. In addition, timer 298 is also connected to the computer 200 via communication line 285 and operates valve 299 to supply water from the fresh water supply 297 to the microbial incubator 122. In this manner, microbial fluid 289 can be automatically incubated in microbial incubator 122 and automatically dispersed into pond 102. Alternatively, this process can be performed by hand.

Figure 3:
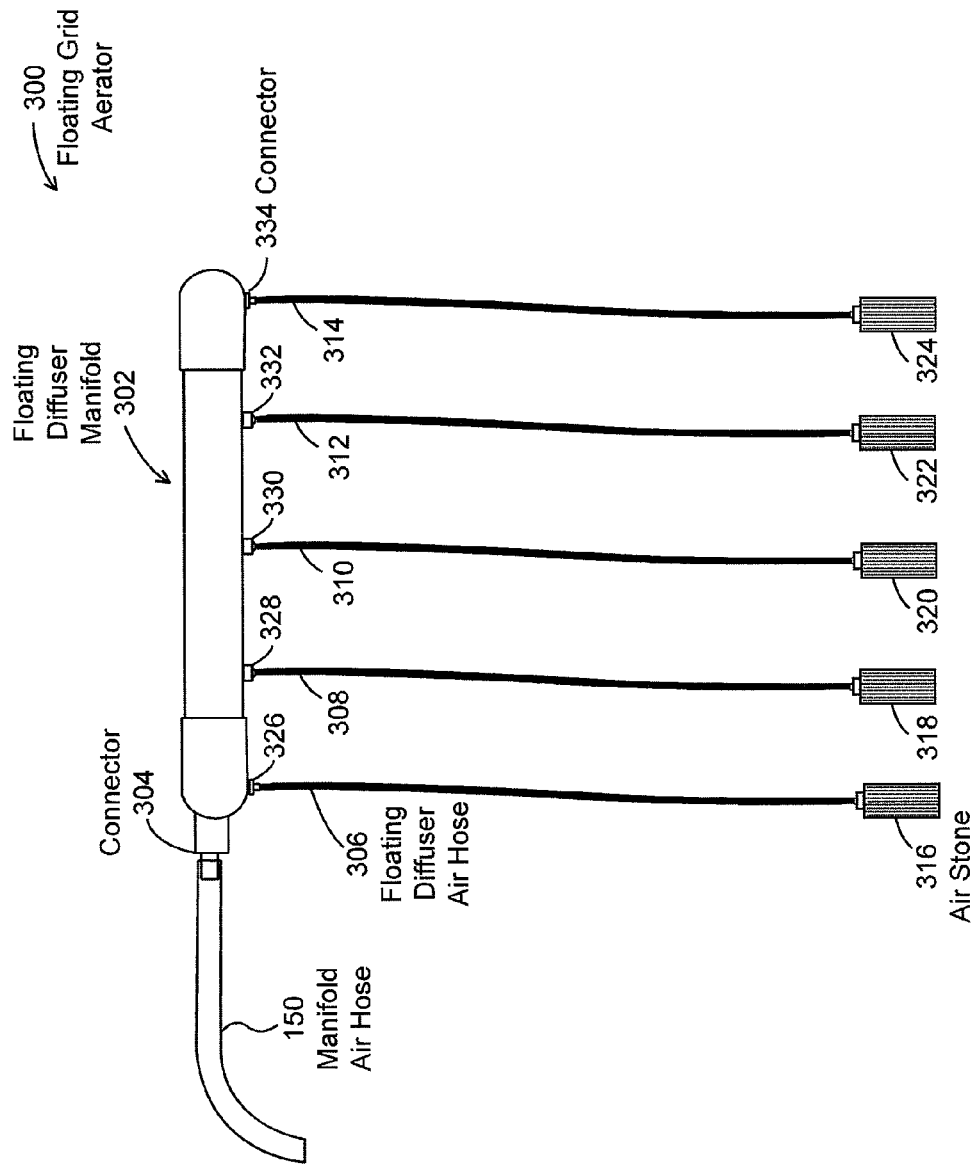
FIG. 3 is a side view of an embodiment of a floating grid aerator.
Figure 4:
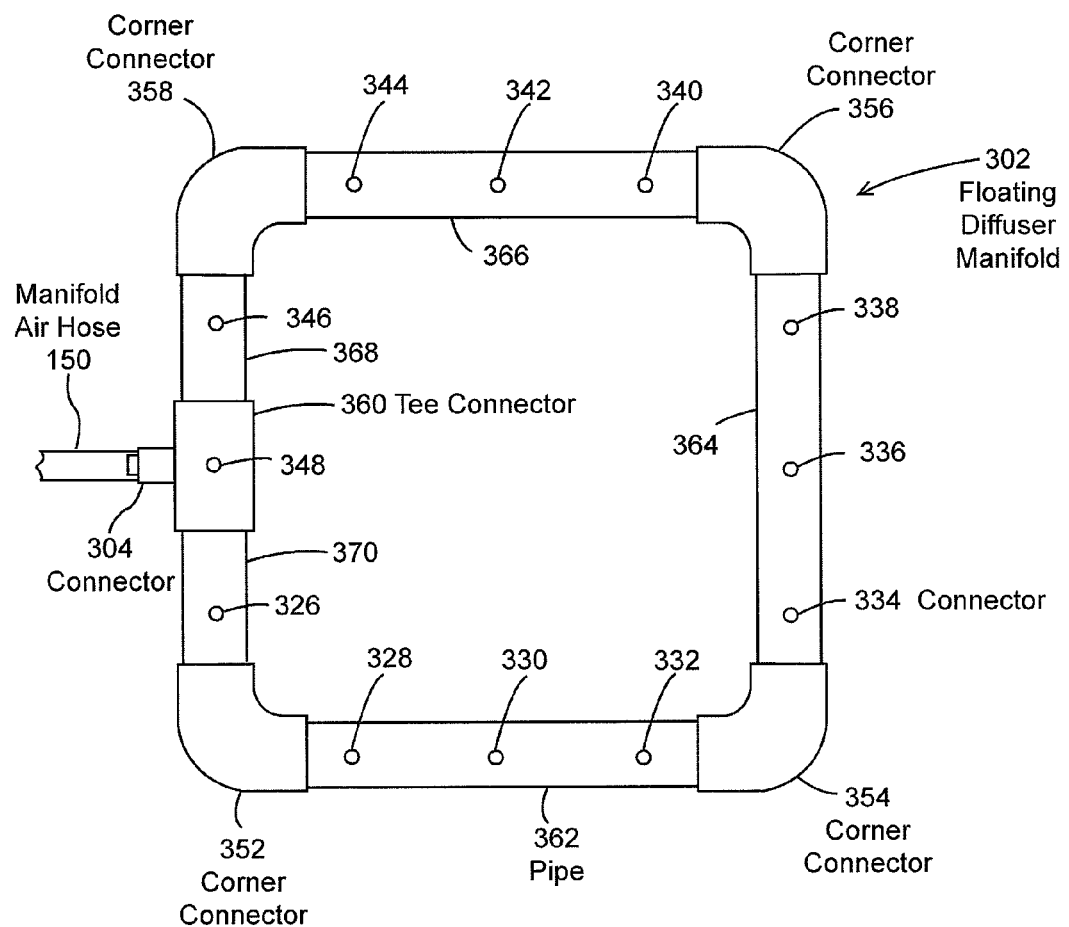
FIG. 4 is a top view of the embodiment of a floating grid aerator disclosed in FIG. 3.

FIG. 3 is a side view of an embodiment of a floating grid aerator 300 that is disposed in the pond 102. The floating grid aerator 300 comprises a floating diffuser manifold 302 that is connected to the manifold air hose 150 via connector 304. The floating diffuser manifold 302 is sufficiently light that the floating diffuser manifold 302 floats on the surface of the pond 102. Floats can also be used if a heavier manifold is used. A plurality of floating diffuser air hoses 306, 308, 310, 312, 314 are attached to the bottom portion of the floating diffuser manifold 302 via connectors 326, 328, 330, 332, 334, respectively. The floating diffuser air hoses 306-314 are sufficiently weighted so that the floating diffuser air hoses 306-314 are suspended beneath the floating diffuser manifold 302 under the surface of the pond 102. Air stones 316, 318, 320, 322, 324 are connected in the floating diffuser air hoses 306, 308, 310, 312, 314, respectively. Other types of diffusers can also be used, including fine bubble membrane diffusers. The air stones 316-324 create small bubbles that are absorbed by the water in the pond 102. The added oxygen that is absorbed by the water in the pond 102 creates aerobic activity in the water of the pond 102. The bubbles created by air stones 316-324 also cause microbial fluid that is dispensed into the pond 102 to multiply and digest solid wastes and otherwise clean and kill bacteria in the water of the pond 102. In addition, the bubbles cause the water in the pond 102 to circulate, which assists in distributing microbes throughout the pond so as to beneficially treat the pond water in an efficient manner.

FIG. 4 is a top view of the embodiment of the floating air manifold 302 illustrated in FIG. 3. As shown in FIG. 4, a plurality of connectors 326, 328, 330, 332, 334, 336, 338, 340, 342, 344, 346, 348 are connected to the bottom portion of the floating air manifold 302 and provide connections for the floating diffuser air hoses, such as floating diffuser air hoses 306-314. Floating air manifold 302 comprises pipes 263, 364, 366, 368, 370 that are connected by corner connectors 352, 354, 356, 358. In addition, a T-connector 360 connects pipes 368, 370. The pipes and connectors can be made of a light material, such as a thin-walled PVC material, or other material, to reduce weight and allow the manifold 302 to float on the surface of the pond 102. The T-connector 360 has a connector 304, which connects the floating diffuser manifold 302 to the manifold air hose 150. Application of compressed air to the floating diffuser manifold 302 via the manifold air hose 150 causes a uniform pressure to be created in the floating diffuser manifold 302, which evenly distributes a source of compressed air to the various air stones 316-324 (FIG. 3).

Hence, a unique system is provided for treating a body of water without being connected to the electrical grid that uses photovoltaic collectors, a battery bank, a plurality of air pumps that are coupled to the battery bank, and photovoltaic collectors and an air pump manifold that provides a uniform source of compressed air that is applied to a plurality of flow meters that meter the flow of the compressed air to a plurality of floating diffuser manifolds. The floating diffuser manifolds are dispersed on the surface of the body of water and provide a uniform diffuser manifold air pressure that is applied to a plurality of air stones that are suspended in the body of water under the plurality of floating diffuser manifolds. Bubbles created by the air stones enhance aerobic activity and the flow and distribution of microbes in the body of water. In addition, a microbial incubator is provided that can incubate probiotic microbes as well as microbes designed for bioremediation, which can be automatically dispersed using a microbial fluid distribution hose in the body of water.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of treating a body of water using solar power comprising:

generating photovoltaic electrical power with photovoltaic collectors;

providing a battery bank that is coupled to said photovoltaic collectors that provides electrical battery power;

using said photovoltaic electrical power to charge said battery bank;

operating a plurality of air pumps using power from both said photovoltaic electric power and electrical battery power;

applying compressed air generated by a plurality of air pumps to at least one air pump manifold that provides at least one uniform source of compressed air;

applying said at least one uniform source of compressed air to a plurality of flow meters that control a flow of air to a plurality of manifold air hoses;

controlling said flow of air through said plurality of manifold air hoses using said plurality of flow meters to distribute air through said plurality of manifold air hoses in a predetermined manner to a plurality of floating diffuser manifolds;

providing a land based microbial incubator;

applying said at least one uniform source of compressed air to an incubator flow meter;

connecting said incubator flow meter to an incubator air hose;

connecting said incubator air hose to an incubator diffuser disposed in said land based microbial incubator;

generating a flow of incubator air bubbles from said incubator diffuser in an incubator fluid disposed in said land based microbial incubator to promote aerobic activity and growth of probiotic microbes and microbes designed for bioremediation in said incubator to produce a concentrated microbial fluid containing aerobically activated probiotic microbes and aerobically activated bioremediation microbes that kill pathogenic bacteria and digest solid wastes in said body of water;

dispensing said concentrated microbial fluid containing said probiotic microbes and bioremediation microbes from said land based microbial incubator into said body of water at a plurality of predetermined locations in said body of water through a microbial fluid distribution hose that is coupled to said land based microbial incubator;

adding water to said land based microbial incubator to incubate additional concentrated microbial fluid containing probiotic microbes and bioremediation microbes to produce an additional supply of concentrated microbial fluid that kill pathogenic bacteria in said body of water;

connecting said plurality of manifold air hoses to said plurality of floating diffuser manifolds, said floating diffuser manifolds providing a uniform diffuser manifold air pressure in each of said floating diffuser manifolds;

applying said uniform diffuser manifold air pressure to a plurality of floating diffuser air hoses that are weighted to extend into said body of water below said floating diffuser manifold;

attaching a plurality of air stones to said floating diffuser air hoses at locations proximate to said predetermined locations in said body of water so that said uniform diffuser manifold air pressure is applied to said plurality of air stones which generate a flow of air bubbles in said body of water that aerate said body of water to increase aerobic activity of said concentrated microbial fluid in said body of water, at locations proximate to said predetermined locations in said body of water, and cause said body of water to circulate, which disperses said concentrated microbial fluid in said body of water to kill pathogenic bacteria in said body of water and digest solid wastes.

2. The method of claim 1 where said dispensing said concentrated microbial fluid into said body of water comprises:

automatically dispensing said microbial fluid at said plurality of predetermined locations using a sprayer.

3. The method of claim 1 where said dispensing said microbial fluid into said body of water comprises:
automatically dispensing said microbial fluid through a microbial fluid distribution hose to a plurality of nozzles that dispense said microbial fluid at said plurality of predetermined locations in said body of water.

4. A system for treating a body of water using solar power comprising:
photovoltaic collectors that generate photovoltaic electrical power;
a battery bank that produces electrical battery power, said battery bank coupled to said photovoltaic collectors so that said photovoltaic collectors charge said battery bank with said photovoltaic electric power;
a plurality of air pumps coupled to said photovoltaic collectors and said battery bank that operate in response to said photovoltaic electrical power and said electrical battery power;
at least one air pump manifold connected to said plurality of air pumps that provides at least one uniform source of compressed air;
a plurality of flow meters coupled to said at least one air pump manifold that control a flow of said at least one uniform source of compressed air to a plurality of manifold air hoses;
a land based microbial incubator having an incubator fluid containing probiotic microbes and bioremediation microbes that kill pathogenic bacteria in said body of water;
an incubator air hose;
an incubator flow meter coupled to said at least one air pump manifold that controls a flow of said at least one uniform source of compressed air through said incubator air hose;
an incubator air stone, coupled to said incubator air hose, that generates a flow of incubator air bubbles in said incubator fluid in response to said flow of said at least one uniform source of compressed air that aerates said incubator fluid and causes aerobic activity in said incubation fluid and causes said incubator fluid to circulate which promotes aerobic activity and growth of said probiotic microbes and said bioremediation microbes to create a concentrated microbial fluid;
a plurality of floating diffuser manifolds, connected to said plurality of manifold air hoses, that provide a uniform diffuser manifold air pressure in said plurality of floating diffuser manifolds in response to said flow of said at least one uniform source of compressed air from said plurality of flow meters;
a plurality of weighted floating diffuser air hoses, that are coupled to said plurality of floating diffuser manifolds, that extend into said body of water below said plurality of floating diffuser manifolds;
a plurality of air stones located at a plurality of predetermined locations in said body of water, that are coupled to said plurality of weighted floating diffuser air hoses, that produce a flow of air bubbles in said body of water in response to said uniform diffuser manifold air pressure that aerate said body of water and cause said body of water to circulate at said predetermined locations;
a microbial fluid distribution hose coupled to said microbial incubator that dispenses said concentrated microbial fluid to said body of water at locations proximate to said plurality of predetermined locations;
a pump that dispenses said concentrated microbial fluid containing said probiotic microbes and said bioremediation microbes from said land based microbial incubator through said microbial fluid distribution hose to said body of water at said locations that are proximate to said plurality of predetermined locations so that circulation of said body of water at said plurality of predetermined locations causes said concentrated microbial fluid to disperse in said body of water and said flow of air bubbles increases aerobic activity of said probiotic microbes and said bioremediation microbes from said concentrated microbial fluid, which increases growth of said probiotic microbes and said bioremediation microbes in said body of water to kill pathogenic bacterial and digest solid wastes;
a valve that adds water to said concentrated microbial fluid in said land based microbial incubator so that additional concentrated microbial fluid containing said probiotic microbes and said bioremediation microbes are incubated in said land based microbial incubator.

* * * * *